United States Patent
Zerbe et al.

(10) Patent No.: US 6,660,292 B2
(45) Date of Patent: Dec. 9, 2003

(54) RAPIDLY DISINTEGRATING FLAVORED FILM FOR PRECOOKED FOODS

(75) Inventors: Horst G. Zerbe, Hudson (CA); Fadia Al-Khalil, Lincoln Park, NJ (US)

(73) Assignee: HF Flavoring Technology LLP, Lincoln Park, NJ (US)

( * ) Notice: Subject to any disclaimer, the term of this patent is extended or adjusted under 35 U.S.C. 154(b) by 0 days.

(21) Appl. No.: 09/884,112

(22) Filed: Jun. 19, 2001

(65) Prior Publication Data

US 2003/0044511 A1 Mar. 6, 2003

(51) Int. Cl.$^7$ .............................................. A61K 47/00
(52) U.S. Cl. ........................ 424/439; 424/400; 514/953; 514/974
(58) Field of Search .................... 424/400, 439; 514/953, 974

(56) References Cited

U.S. PATENT DOCUMENTS

| | | |
|---|---|---|
| 3,753,732 A | 8/1973 | Boroshok |
| 4,136,145 A | 1/1979 | Fuchs et al. |
| 4,136,162 A | 1/1979 | Fuchs et al. |
| 4,713,239 A | 12/1987 | Babaian et al. |
| 4,842,854 A | 6/1989 | Babaian et al. |
| RE33,093 E | 10/1989 | Schiraldi et al. |
| 4,921,695 A | 5/1990 | Babaian et al. |
| 4,925,670 A | 5/1990 | Schmidt |
| 5,234,957 A | 8/1993 | Mantelle |
| 5,332,576 A | 7/1994 | Mantelle |
| 5,354,551 A | 10/1994 | Schmidt |
| 5,446,070 A | 8/1995 | Mantelle |
| 5,462,749 A | 10/1995 | Rencher |
| 5,470,581 A * | 11/1995 | Grillo et al. ................ 424/479 |
| 5,700,478 A | 12/1997 | Biegajski et al. |
| 5,948,430 A * | 9/1999 | Zerbe et al. ................ 424/435 |

FOREIGN PATENT DOCUMENTS

| | | |
|---|---|---|
| AU | 601478 | 9/1987 |
| AU | A75496/96 | 7/1997 |
| DE | 2148159 | 8/1972 |
| EP | 0109269 | 5/1984 |
| EP | 0273069 | 7/1988 |
| EP | 0452446 | 10/1991 |
| GB | 853378 | 11/1960 |
| GB | 2048642 | 12/1980 |
| WO | 98/20862 | 5/1998 |

OTHER PUBLICATIONS

Chemical Abstracts, vol. 97, 1982, p. 487, Abstract No. 4931e, Columbus, Ohio, USA.
Chemical Abstracts, vol. 100, 1984, p. 530, Abstract No. 137715q, Columbus, Ohio USA.
Patent Abstracts of Japan, JP–A–57028102 (Sanei Chem Ind Ltd), Feb. 15, 1982.

* cited by examiner

*Primary Examiner*—Thurman K. Page
*Assistant Examiner*—Charesse Evans
(74) *Attorney, Agent, or Firm*—Price, Heneveld, Cooper, DeWitt & Litton

(57) ABSTRACT

An improved rapidly disintegrating flavored film that quickly and completely disintegrates on food items, including precooked food items, such as hamburgers, chicken, and pizza, includes a hydroxypropyl cellulose, a modified starch and a flavor ingredient. The flavored films of this invention completely disintegrate on precooked food items in less than a minute, and often in less than 30 seconds, whereas previously known flavored films typically do not completely dissolve on precooked food items. The flavored films of this invention may be advantageously employed for uniformly and reproducibly flavoring food items at a desired level.

21 Claims, No Drawings

RAPIDLY DISINTEGRATING FLAVORED FILM FOR PRECOOKED FOODS

FIELD OF THE INVENTION

This invention relates generally to the food additive field, and more particularly to flavored films for use on food.

BACKGROUND OF THE INVENTION

Conventional methods for flavoring foods include sprinkling powdered flavoring ingredients such as spices or liquid flavoring ingredients such as flavor oil directly on food. This technique has several disadvantages, especially when used in the fast-service restaurant industry. One disadvantage is that it is difficult to uniformly distribute flavoring ingredients over the surface of food. When liquid or powdered flavoring ingredients are sprinkled on a food item, it is not uncommon for one area of the food item (e.g., a hamburger patty or a cut of meat) to be excessively flavored while another area of the food item is inadequately flavored.

Another disadvantage with sprinkling powered or liquid flavoring ingredients on a food item is that the amount of flavoring may vary from one food item to the next. This is especially undesirable in the fast-service restaurant industry, since customers have come to expect exceptional product uniformity. Customers expect that a particular menu item will have the same taste every time at every restaurant within a nationwide or region wide chain of restaurants. Such consistency cannot be achieved by having a food preparer sprinkle flavoring ingredients on a food item guided only by the food preparer's own perception, experience and skill.

Another disadvantage with sprinkling flavor ingredients on a food item is that it can be extremely time consuming, especially when care is taken to provide uniform flavor distribution for a single food item and/or a consistent amount of flavoring for each food item.

Flavoring ingredients have also been formulated into a paste that can be applied to food using an apparatus resembling a chalking gun, or spatula, knife or similar tool. This allows the food preparer to more easily see whether the flavor ingredients have been evenly distributed over the surface of a food item. However, the use of a flavored paste does not ensure that a predetermined amount of flavor ingredient has been added to a food item and, therefore, does not ensure product uniformity. Further, application of a paste is likely to be as time consuming or even more time consuming than sprinkling a powdered or liquid flavor ingredient on food.

Quick-service restaurants (QSRs) desire to achieve brand identification by customizing the flavor of their products. Typically, customers cannot distinguish between the products from different restaurants or restaurant chains by the taste of the substrate foods (e.g., hamburger patty, chicken meat) alone. Accordingly, the preferred means of imparting a distinctive, brand-identifying flavor to a food is by adding or supplementing the food substrate with distinctive flavor ingredients. However, extreme care is needed to impart the appropriate level of supplemental flavoring to each food substrate on a consistent basis. Due to the rapidity at which foods must be prepared, especially during peak demand periods at QSRs, it is very difficult to deliver the precise amount of a supplemental flavoring to a food substrate that is needed to impart the desired distinctive, brand-identifying flavor using conventional flavoring techniques. Accordingly, there is a need, especially in the QSR business, for a flavoring device and method that can easily and inexpensively deliver a precise, predetermined quantity of supplemental flavor(s) to a precooked food substrate.

U.S. patent application Ser. No. 09/306,262 describes a flavored polymer film that can be placed on a food item to impart a desired flavor. The flavored film is preferably provided in a preformed shape and size conforming with the shape and size of the food item, thus ensuring uniform distribution of a predetermined amount of a flavoring ingredient over the surface of a food item. Also, the premeasured, pre-shaped flavoring films can be conveniently provided on a substrate having a release coating that facilitates easy and rapid application of the flavoring film to a food item.

The known flavored films comprise one or more water-soluble polymers, one or more water-insoluble, water swellable polymers, one or more surfactants, and a natural or artificial flavor. When placed on the surface of a food, the flavored film disintegrates at a predetermined rate, thereby releasing the flavor ingredients to the food. However, if the food is not fresh or frozen, but rather precooked, the film may not disintegrate rapidly. Under the conditions of the cooking processes, commonly used in fast-service restaurants (e.g., flame-broiling, clam shell cooking, etc.), the surface of the food item may be partially burnt after the cooking or grilling process is completed. This will alter the affinity of the film to the food item, and the film will not conform as easily to the surface of a precooked food item as it would to a fresh, noncooked food item. Depending on the temperature of the food item during the cooking process, moisture will evaporate, leaving the surface of the food item dry. The lack of moisture at the surface of the food item will adversely affect the initial hydration of the flavored film. Thus, depending on the residual moisture at the surface of the substrate that is available for hydration of the film and the degree to which the meat was burnt during the cooking process, hydration of the film and subsequent disintegration of the film may be slow or even incomplete, in which case undissolved or undisintegrated residue of the film remains on the food item. Incomplete disintegration of a flavored film is highly undesirable as it would cause the food item to have a texture that consumers may find offensive.

Accordingly, there is a need for a flavored film that disintegrates more rapidly, especially on precooked foods.

SUMMARY OF THE INVENTION

It has been discovered that flavored films which disintegrate more rapidly than previously known flavored films can be obtained by replacing the polymers used in the known flavored films with hydroxypropyl cellulose and modified starch. More specifically, the flavored films of this invention completely disintegrate in less than a minute, and often in less than 30 seconds, when placed on precooked foods such as chicken, pizza or hamburger, whereas the previously known flavored films generally comprised of polyvinylpyrrolidone (povidone) and hydroxypropylmethyl cellulose often do not completely disintegrate when placed on these same precooked foods.

The invention provides flavored films containing a predetermined amount of one or more flavoring ingredients. The product facilitates easy and inexpensive delivery of a precise, predetermined quantity of supplemental flavor ingredients to a precooked food substrate, whereby the resulting food item consistently has a predetermined, potentially brand-identifying taste.

These and other features, advantages and objects of the present invention will be further understood and appreciated by those skilled in the art by reference to the following specification and claims.

DESCRIPTION OF THE PREFERRED EMBODIMENTS

This invention pertains to rapidly disintegrating flavored films which, when placed on a food substrate (e.g., a hamburger patty, piece of chicken, or pizza), disintegrate under the influence of heat and moisture, thereby releasing the flavor to the food substrate. This has been accomplished with known flavored films when the substrate is a piece of uncooked chicken, pizza or hamburger. However, if the substrate is a precooked hamburger instead of a fresh or frozen food item, the film does not disintegrate completely. Rather, a residue of the film remains on the food substrate.

Surprisingly, it has been discovered that replacing the polyvinyl alcohol and/or hydroxypropylmethyl cellulose and polyvinylpyrrolidone with a combination of hydroxypropyl cellulose and a modified starch improves the solubility properties of the film when placed on precooked foods, even though starch is only poorly, or at least not completely, soluble in water. The improved rapid disintegration properties of the flavored films of this invention, especially on precooked foods, is believed to be due, at least in part, to the excellent properties of starch as a disintegrant. Also, the improved water dissolution kinetics of hydroxypropyl cellulose as compared with a combination of polyvinylpyrrolidone and hydroxypropylmethyl cellulose is expected to improve rapid disintegration properties of the film.

In accordance with one aspect of the invention, an improved rapidly disintegrating flavored film that is useful for flavoring precooked food items, such as hamburgers, chicken, pizza, and the like, is comprised of a polymer base consisting of a mixture of hydroxypropyl cellulose and modified starch, a film-forming agent, and a flavor ingredient.

Hydroxypropyl cellulose is a cellulose ether with hydroxypropyl substitution. Hydroxypropyl cellulose is also a nonionic, water-soluble, film-forming polymer. The concentration of polymer base in the film should be sufficient to be able to hold the amount of flavor oil or flavor emulsion required for the particular application. The total concentration of solids in the coating solution should range between 5 and 50%. The viscosity of the coating solution increases with the concentration of solids. Conveniently, hydroxypropyl cellulose is commercially available in a variety of molecular weights which can be blended with water and other ingredients to achieve a desired viscosity that is conducive for processing and handling of the solution prior to evaporation of the water to form the desired flavored film. Examples of commercially available hydroxypropyl cellulose materials that can be used in preparing the flavored films of this invention include Klucel® EF and Klucel® GF, which are marketed by Aqualon Company of Hercules Incorporated. Klucel® EF hydroxypropyl cellulose has a weight average molecular weight of about 80,000 and Klucel® GF has a weight average molecular weight of about 300,000.

Modified starches include any of several water-soluble polymers derived from a starch (e.g., corn starch, potato starch, tapioca starch) such as by acetylation, halogenation, hydrolysis (e.g., such as which an acid), or enzymatic action. Generally, any type of water-soluble modified starch, including but not limited to oxidized, ethoxyolated, cationic, lypophilic and pearl starch, may be used. Maltodextrins are a preferred class of modified starches obtained by hydrolysis. Commercially available maltodextrins that may be used in preparing the flavored films of this invention include Maltrin® M100, Maltrin® M180, Maltrin® QD M550, and Maltrin® QD M600, marketed by Grain Processing Corporation. Another commercially available modified starch that may be advantageously employed in preparing the rapidly disintegratable flavored films of this invention is Pure-Cote® B792 modified corn starch, also available from Grain Processing Corporation.

On a moisture free basis, the flavored films of this inventions typically contain, on a weight basis, from about 20% to about 70% hydroxypropyl cellulose, from about 5% to about 70% modified starch, and up to about 60% of a flavor ingredient. The flavored films may contain other ingredients, including surfactants, wetting agents, other film-forming polymers, and other ingredients.

It was determined that the disintegration time of the film, when placed on a precooked food item, such as a hamburger patty, chicken, pizza, etc., can be further reduced by increasing the wettability and tortuosity of the film. The wettability of the film can be increased by adding surfactants to the film composition. The surfactant causes a reduction of the contact angle of moisture on the film. Examples of edible nonionic surfactants that may be used include polyoxyethylene sorbitan fatty acid esters, polyoxyethylene alkyl ethers, and polyoxyethylene castor oil derivatives. An example of a suitable commercially available surfactant that may be used is polysorbate 80, which is a mixture of oleate esters of sorbitol and sorbitol anhydrides, consisting predominantly of the monoester, condensed with approximately 20 moles of ethylene oxide. Polysorbate 80 is sold as Tween® 80 by ICI Surfactants. The HLB value of the polyoxyethylene sorbitan fatty acid ester should be greater than 10, but should not exceed 20. The inclusion of a surfactant has proven very beneficial. In many cases, a flavored film comprising a modified starch, hydroxypropyl cellulose and a surfactant will disintegrate in less than 15 seconds on precooked hamburger meat.

While starch provides the film with an initial tortuosity level, the tortuosity of a flavored film can be further increased and adjusted to the desired level by adding a water-soluble component such as sorbitol, a gel-former such as silicon dioxide, or liquids that are miscible with water, such as propylene glycol, glycerin, polyethylene-glycol sorbitan oleate, or the like.

The tensile strength of the flavored films may be improved by adding a film-forming polymer, or mixtures of such film-forming polymers. Suitable film-forming agents include a variety of natural or synthetic polymers that improve the coherence of the three-dimensional network of the polymer matrix such as through hydrogen bonding. In order to be compatible with the polymer base solution, the film-forming agents have to be soluble or swellable in water. Examples of suitable film-formers that are soluble or swellable in water include polyvinyl alcohol, natural and synthetic gums like guar gum, xanthane gum, gum arabic, cellulose gum, acacia gum, tragacantha, sodium alginate, sodium carboxymethyl cellulose, hydroxyethyl cellulose, gelatin, polycarbophil, acrylate-based water-dispersible resins like methyl methacrylate copolymers, or other suitable water-soluble or swellable polymers. Because the water solubility of these film-forming agents is usually poor, the concentration of the film-forming agent should be optimized to provide a good balance of rapid disintegrating properties (upon contact with a precooked food item) and good tensile strength (to allow the flavored film to be easily removed from a carrier substrate without breaking).

An attempt to replace the starch in the polymer base completely by film-forming agents such as cellulose gum or gelatin to achieve better film properties were unsuccessful. The resulting film properties were poor, indicating that the presence of starch in the film is required to achieve the required film properties.

| Polymer Base Solution: | PB 1 | | PB 2 | |
|---|---|---|---|---|
| | weight (g) | % | Weight (g) | % |
| Water | 750.0 | 87.9 | 150.0 | 88.1 |
| Premix 1: | | | | |
| Kollidon 30 | 29.5 | 3.5 | 5.9 | 3.5 |
| Cellulose Gum | 29.5 | 3.5 | — | — |
| Gelatin | — | — | 5.9 | 3.5 |
| Premix 2: | | | | |
| HPC GF | 21.0 | 2.5 | 4.2 | 2.5 |
| HPC EF | 23.0 | 2.7 | 4.2 | 2.5 |
| | 853.0 | 100.0 | 170.2 | 100.0 |

While the film obtained with PB 1 was too soft, the film resulting from PB 2 was too brittle.

The flavor ingredients used in the flavored films of this invention may include any of various natural and/or artificial flavor components. Examples include grill flavor, garlic flavor, pizza flavor, natural or artificial fruit flavors, or other artificial or natural flavors or spices commonly used in food. Natural smoke flavors and natural grill flavors are commercially available, (e.g., from Red Arrow Products Company LLC).

In addition to flavor ingredients, other food enhancing ingredients such as a natural browning agent may be added to the flavored films. A commercially available natural browning agent is sold by Red Arrow Products Company LLC (e.g., Maillose™ natural browning agent).

The flavored films of this invention may be prepared by mixing the hydroxypropyl cellulose, modified starch, flavoring and other ingredients in water to produce a solution that is coated onto a suitable carrier substrate, and dried to form a flavored film. The carrier substrate has to have release characteristics that ensure good removal of the film upon drying. Suitable carrier substrates include siliconized or polyethylene-impregnated kraft-paper, siliconized polyethylene-terephthalate film, polyethylene film, and the like.

The flavored films of this invention are used by laying the film directly on a precooked food item such as a hamburger patty, a chicken patty or pizza, while the item is still hot. The film may be placed on the food item either during cooking or immediately after cooking is complete. For easier handling of the film and in particular for better protection against moisture and contaminants that may be found in a restaurant kitchen, the film may be kept in a closed dispenser from which pieces will be released when needed. The flavored films of this invention will typically disintegrate in less than a minute, and preferably will disintegrate in less than 30 seconds, and in some embodiments less than 15 seconds, without leaving any noticeable residue. The invention thus facilitates rapid, uniform, and consistent flavoring to food items in an economical manner.

Particular embodiments of the invention will be described in further detail with respect to the following examples.

EXAMPLES

Polymer Base Solution

A typical example of the polymer base solution according to the new composition and the process for preparing it are as follows:

Composition

| | % | g |
|---|---|---|
| Water | 81.3 | 750.0 |
| Premix 1: | | |
| Purecote B792 | 9.3 | 85.5 |
| Maltrin QD600 | 3.1 | 28.5 |
| Premix 2: | | |
| HPC GF | 3.1 | 28.5 |
| HPC EF | 3.2 | 29.9 |
| | 100.0 | 922.4 |

Preparation: Heat 350 ml water to 60° C. and slowly add premix 1. Mix until clear solution has been formed using high-shear mixer. Cool to room temperature (1). To 300 ml water, slowly add premix 2 under stirring (high-shear mixer) until a clear solution has been formed (2). Combine (1) and (2).

Final Coating Solutions

| Flavor | % Flavor Emulsion | % Tween 80 | % Polymer Base Solution |
|---|---|---|---|
| Garlic | 25 | 3.5 | 71.5 |
| Montreal | 22 | 4 | 74 |
| Carribean | 17 | 4 | 79 |
| Bacon | 25 | 3.5 | 71.5 |
| Lemon Pepper | 17 | 3 | 80 |
| Woodfired Smoke | 7 | 3 | 90 |

Preparation

The surfactant is added to the polymer base solution in a quantity according to table B. After mixing, the flavor emulsion is added slowly under stirring using a stirrer bar.

Coating

Under laboratory conditions, the final coating solution is coated onto a suitable substrate using a suitable coating device, like a Meyer rod or knife-over-roll coater. Under production conditions, coating is performed using a knive-over-roll, gravure, reverse-roll, slot-die, or other suitable coating device. The film is dried using hot air. Pre-drying using infrared radiators may be suitable.

Converting

After leaving the drying oven, the dry film is slit and rewound. If necessary for further processing, the film is sprinkled with a thin layer of corn starch or any other suitable absorbant prior to rewinding to prevent sticking.

Solutions A through D' were prepared having the compositions tabulated below. The solutions were coated onto a suitable carrier substrate and dried to form a film. Thereafter the films were placed on cooked hamburgers and the time to disintegration was recorded. Also, the tensile strength and cohesiveness of the films was rated on a scale of 1 to 10, with a 1 indicating poor tensile strength and cohesion wherein the film tears immediately upon being subjected to tension, and a rating of 10 indicating good tensile strength and cohesiveness wherein film breakage does not occur even under strong tension.

| Compound | Weight % | | | | |
|---|---|---|---|---|---|
| | A | B | C | D | E |
| Klucel EF | 5.0 | 4.9 | 4.9 | 4.9 | 4.6 |
| Klucel GF | 5.0 | 4.9 | 4.9 | 4.9 | 4.6 |
| Purecote B792 | 0.9 | 1.7 | 1.1 | 1.1 | 1.9 |
| Maltrin M100 | 1.4 | 0.0 | 0.0 | 0.0 | 0.0 |
| Maltrin M180 | 0.0 | 0.0 | 2.1 | 0.0 | 0.0 |
| Maltrin QD M550 | 0.0 | 0.0 | 0.0 | 1.1 | 0.0 |
| Maltrin QD M600 | 0.0 | 0.0 | 0.0 | 0.0 | 1.9 |
| Water | 82.9 | 83.8 | 83.2 | 84.1 | 83.0 |
| Flavor (Smoke) | 3.8 | 3.8 | 3.8 | 3.8 | 3.8 |
| Glycerin | 1.0 | 1.0 | 0.0 | 0.0 | 0.0 |
| Total | 100.0 | 100.0 | 100.0 | 100.0 | 100.0 |
| Disintegration | 30 sec. | 30 sec. | 30 sec. | 30 sec. | 35 sec. |
| Tensile Strength | 4.0 | 6.0 | 4.0 | 3.0 | 7.0 |

| Compound | Weight % | | |
|---|---|---|---|
| | F | G | H |
| Klucel EF | 4.6 | 4.9 | 5.1 |
| Klucel GF | 4.2 | 4.4 | 4.7 |
| Purecote B792 | 2.0 | 1.7 | 1.5 |
| Maltrin QD M550 | 2.0 | 1.7 | 1.5 |
| Maltrin QD M600 | 2.0 | 1.7 | 1.5 |
| Water | 85.2 | 85.5 | 85.8 |
| Total | 100.0 | 100.0 | 100.0 |
| Disintegration | 22 sec. | 22 sec. | 25 sec. |
| Tensile Strength | 5.0 | 6.0 | 7.0 |

| Compound | Weight % | |
|---|---|---|
| | I | J |
| Klucel EF | 3.2 | 3.0 |
| Klucel GF | 2.7 | 2.5 |
| Purecote B792 | 5.4 | 4.9 |
| Maltrin QD M600 | 5.4 | 4.9 |
| Water | 72.9 | 66.7 |
| Flavor | 7.6 | 14.8 |
| Glycerin | 2.7 | 3.3 |
| Total | 100.0 | 100.0 |
| Disintegration | 40 sec. | 50 sec. |
| Tensile Strength | 7.0 | 8.0 |

| Compound | Weight % | | | |
|---|---|---|---|---|
| | K | L | M | N |
| Klucel EF | 3.3 | 3.3 | 3.2 | 3.1 |
| Klucel GF | 2.7 | 2.7 | 2.7 | 2.6 |
| Purecote B792 | 5.5 | 5.5 | 5.4 | 5.1 |
| Maltrin QD M600 | 5.5 | 5.5 | 5.4 | 5.1 |
| Water | 73.6 | 73.6 | 72.3 | 69.5 |
| Tween 80 | 1.8 | 0.0 | 1.8 | 1.7 |
| Maillose | 0.0 | 1.8 | 1.8 | 0.0 |
| Flavor | 7.7 | 7.7 | 7.6 | 12.8 |
| Total | 100.0 | 100.0 | 100.0 | 100.0 |
| Disintegration | 35 sec. | 65 sec. | 45 sec. | >60 sec. |
| Tensile Strength | 6.0 | 6.0 | 5.0 | 8.0 |

| Compound | Weight % | | | | | | | | | | | |
|---|---|---|---|---|---|---|---|---|---|---|---|---|
| | O Garlic | P Montr. | Q Woodf. | R Bacon | S Cheese | T Lemon P. | U Garlic | V Montr. | W Woodf. | X Bacon | Y Cheese | Z Lemon P. |
| Klucel EF | 3.17 | 3.04 | 3.35 | 3.17 | 3.17 | 3.22 | 3.22 | 3.09 | 3.41 | 3.22 | 3.22 | 3.22 |
| Klucel GF | 3.03 | 2.91 | 3.20 | 3.03 | 3.03 | 3.08 | 3.08 | 2.96 | 3.26 | 3.08 | 3.08 | 3.08 |
| Purecote B792 | 4.13 | 3.97 | 4.37 | 4.13 | 4.13 | 4.20 | 4.20 | 4.03 | 4.45 | 4.20 | 4.20 | 4.20 |

-continued

| | | | | | | | | | | | | |
|---|---|---|---|---|---|---|---|---|---|---|---|---|
| Maltrin QD M600 | 1.38 | 1.32 | 1.46 | 1.38 | 1.38 | 1.40 | 1.40 | 1.34 | 1.48 | 1.40 | 1.40 | 1.40 |
| Water | 71.63 | 68.76 | 75.73 | 71.63 | 71.63 | 72.84 | 72.84 | 69.88 | 77.09 | 72.84 | 72.84 | 72.84 |
| Tween 80 | 4.17 | 4.00 | 4.41 | 4.17 | 4.17 | 2.54 | 2.54 | 2.44 | 2.69 | 2.54 | 2.54 | 2.54 |
| Flavor | 12.50 | 16.00 | 7.49 | 12.50 | 12.50 | 12.71 | 12.71 | 16.26 | 7.62 | 12.71 | 12.71 | 12.71 |
| Total | 100.00 | 100.00 | 100.00 | 100.00 | 100.00 | 100.00 | 100.00 | 100.00 | 100.00 | 100.00 | 100.00 | 100.00 |
| Disintegration | 15 sec. | 15 sec. | 20 sec. | 15 sec. | 15 sec. | 15 sec. | 25 sec. | 25 sec. | 35 sec. | 28 sec. | 29 sec. | 25 sec. |
| Tensile Strength | 6.0 | 6.0 | 7.0 | 6.0 | 5.0 | 6.0 | 7.0 | 7.0 | 7.5 | 7.0 | 6.0 | 7.0 |

Disintegration: Time in seconds on cooked hamburger
Tensile Strength; Scale 1 to 10
1 = poor tensile strength and cohesion of film; tears immediately under tension
10 = good tensile strength and cohesion of film; no web break even under strong tension The flavored films of this invention typically disintegrated in less than 60 seconds, with most of the films disintegrating in about 30 seconds or less, and many of the films disintegrating in about 15 seconds.

The above description is considered that of the preferred embodiments only. Modifications of the invention will occur to those skilled in the art and to those who make or use the invention. Therefore, it is understood that the embodiments described above are merely for illustrative purposes and not intended to limit the scope of the invention, which is defined by the following claims as interpreted according to the principles of patent law, including the doctrine of equivalents.

The invention claimed is:

1. A flavored film that rapidly disintegrates when placed on a cook food item, comprising:
   a hydroxypropyl cellulose;
   a modified starch;
   a surfactant; and
   a flavor ingredient, the flavored film capable of disintegrating in less than a minute without leaving a noticeable residue when placed on a hot food item.

2. The flavored film of claim 1, wherein the modified starch is maltodextrin.

3. The flavored film of claim 1, wherein the film comprises, on a moisture-free weight basis, from about 20% to about 70% hydroxypropyl cellulose, from about 5% to about 70% modified starch, and up to about 60% of a flavor ingredient.

4. A flavored film that rapidly disintegrates when place on a cooked food item, comprising:
   a hydroxypropyl cellulose;
   a modified starch;
   a flavor ingredient; and
   a surfactant.

5. The flavored film of claim 4, wherein the surfactant is a polyoxyethylene sorbitan fatty acid ester.

6. The flavored film of claim 5, wherein the surfactant is polysorbate 80.

7. The flavored film of claim 4, wherein the surfactant has an HLB of from about 10 to about 20.

8. The flavored film of claim 1, further comprising a film-forming polymer.

9. The flavored film of claim 8, wherein the film-forming polymer is selected from the group consisting of guar gum, xanthane gum, gum arabic, cellulose gum, acacia gum, tragacantha, hydroxyethyl cellulose, gelatin, polycarbophil, methyl methacrylate copolymers or other acrylate-based water-dispersible resins, polyvinyl alcohol, sodium alginate, and sodium carboxymethyl cellulose.

10. A flavored food comprising:
    a hot food item; and
    a film on the surface of the hot food item, the film comprised of hydroxypropyl cellulose, a modified starch, a surfactant and a flavor ingredient.

11. The flavored food of claim 10, further comprising a film-forming polymer.

12. The flavored food of claim 11, wherein the film-forming polymer is selected from the group consisting of guar gum, xanthane gum, gum arabic, cellulose gum, acacia gum, tragacantha, hydroxyethyl cellulose, gelatin, polycarbophil, methyl methacrylate copolymers or other acrylate-based water-dispersible resins, polyvinyl alcohol, sodium alginate, and sodium carboxymethyl cellulose.

13. A method of flavoring a food, comprising:
    providing a flavored film supported on a carrier substrate, the flavored film comprising a hydroxypropyl cellulose, a modified starch, a surfactant and a flavor ingredient;
    separating the flavored film from the carrier substrate; and
    placing the flavored film on a food item.

14. The method of claim 13, wherein the film further comprises a film-forming polymer.

15. The method of claim 14, wherein the film-forming polymer is selected from the group consisting of guar gum, xanthane gum, gum arabic, cellulose gum, acacia gum, tragacantha, hydroxyethyl cellulose, gelatin, polycarbophil, methyl methacrylate copolymers or other acrylate-based water-dispersible resins, polyvinyl alcohol, sodium alginate, and sodium carboxymethyl cellulose.

16. A flavoring product comprising:
    a carrier substrate; and
    a flavored film supported on the carrier substrate, the flavored film comprising a hydroxypropyl cellulose, a modified starch, a surfactant and a flavor ingredient, the carrier substrate having release characteristics that allow removal of the film from the carrier substrate.

17. The flavoring product of claim 16, further comprising a film-forming polymer.

18. The flavoring product of claim 17, wherein the film-forming polymer is selected from the group consisting of guar gum, xanthane gum, gum arabic, cellulose gum, acacia gum, tragacantha, hydroxyethyl cellulose, gelatin, polycarbophil, methyl methacrylate copolymers or other acrylate-based water-dispersible resins, polyvinyl alcohol, sodium alginate, and sodium carboxymethyl cellulose.

19. The flavoring product of claim 16, wherein the carrier substrate is selected from the group consisting of siliconized kraft-paper, polyethylene-impregnated kraft paper, siliconized polyethylene-terephthalate film, and siliconized polyethylene film.

20. A flavored film that rapidly disintegrates when placed on a precooked food item, comprising:
   a polymer blend comprising a mixture of hydroxypropyl cellulose and a modified starch;
   a surfactant;
   a film-forming agent; and
   a flavor ingredient.

21. The flavored film of claim 20, wherein the film-forming polymer is selected from the group consisting of guar gum, xanthane gum, gum arabic, cellulose gum, acacia gum, tragacantha, hydroxyethyl cellulose, gelatin, polycarbophil, methyl methacrylate copolymers or other acrylate-based water-dispersible resins, polyvinyl alcohol, sodium alginate, and sodium carboxymethyl cellulose.

* * * * *

UNITED STATES PATENT AND TRADEMARK OFFICE
CERTIFICATE OF CORRECTION

PATENT NO. : 6,660,292 B2
DATED : December 9, 2003
INVENTOR(S) : Horst G. Zerbe et al.

It is certified that error appears in the above-identified patent and that said Letters Patent is hereby corrected as shown below:

Column 1,
Line 40, "chalking" should be -- caulking --.

Column 3,
Line 60, "which" should be -- with --.

Column 4,
Line 8, "inventions" should be -- invention --.

Column 10,
Line 25, before "hydroxypropyl" insert -- a --.

Signed and Sealed this

Twenty-second Day of June, 2004

JON W. DUDAS
*Acting Director of the United States Patent and Trademark Office*